United States Patent
Jiang

(10) Patent No.: US 11,558,494 B2
(45) Date of Patent: Jan. 17, 2023

(54) METHOD AND APPARATUS FOR PROCESSING DATA, USER EQUIPMENT AND COMPUTER-READABLE STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 94 days.

(21) Appl. No.: 16/619,933

(22) PCT Filed: Jun. 19, 2017

(86) PCT No.: PCT/CN2017/088975
§ 371 (c)(1),
(2) Date: Dec. 5, 2019

(87) PCT Pub. No.: WO2018/232559
PCT Pub. Date: Dec. 27, 2018

(65) Prior Publication Data
US 2021/0084129 A1 Mar. 18, 2021

(51) Int. Cl.
*H04L 69/28* (2022.01)
*H04L 5/00* (2006.01)
*H04W 72/04* (2009.01)

(52) U.S. Cl.
CPC ............ *H04L 69/28* (2013.01); *H04L 5/0055* (2013.01); *H04W 72/0446* (2013.01)

(58) Field of Classification Search
CPC ..... H04L 69/28; H04L 5/0055; H04L 5/0058; H04L 5/0044; H04L 1/1874; H04W 72/0446; H04W 28/06
(Continued)

(56) References Cited

U.S. PATENT DOCUMENTS

2009/0103478 A1* 4/2009 Sammour ............ H04L 69/324
370/328
2010/0135202 A1* 6/2010 Chun ..................... H04L 1/1877
370/328
(Continued)

FOREIGN PATENT DOCUMENTS

CN 1913534 A 2/2007
CN 101483505 A 7/2009
(Continued)

OTHER PUBLICATIONS

First Office Action issued in Chinese Application No. 201780000612. 2, dated Nov. 3, 2020 with English translation (21p).
(Continued)

*Primary Examiner* — Mang Hang Yeung
(74) *Attorney, Agent, or Firm* — Arch & Lake LLP

(57) ABSTRACT

A method of processing data includes: receiving, by a Packet Data Convergence Protocol (PDCP) layer, a PDCP Service Data Unit (SDU) from an upper layer; and deleting the PDCP SDU and a PDCP Packet Data Unit (PDU) corresponding to the PDCP SDU upon determining that a discard timer corresponding to the PDCP SDU is not expired and a preset condition is satisfied. The PDCP SDU is mapped to an Unacknowledged Mode (UM) or a Transparent Mode (TM) of a Radio Link Control (RLC) layer. Thus, the PDCP SDU will not reside in a UE cache, thereby reducing cache space occupied by the PDCP SDU.

12 Claims, 5 Drawing Sheets

---

S201: Receive, by a PDCP layer, a PDCP SDU from an upper layer

S202: For a PDCP SDU mapped to a UM or a TM of a RLC layer, when a discard timer corresponding to the PDCP SDU does not expire and it is confirmed, based on second indication information fed back to the PDCP layer by the RLC layer, that an RLC PDU associated with the PDCP PDU corresponding to the PDCP SDU is delivered to a lower layer, delete the PDCP SDU and a PDCP PDU corresponding to the PDCP SDU

(58) Field of Classification Search
USPC .......................................................... 370/336
See application file for complete search history.

(56) References Cited

U.S. PATENT DOCUMENTS

| | | | | |
|---|---|---|---|---|
| 2010/0304733 | A1* | 12/2010 | Yi ........................... | H04L 1/188 455/422.1 |
| 2011/0085566 | A1* | 4/2011 | Bucknell ................. | H04L 47/33 370/412 |
| 2013/0170496 | A1* | 7/2013 | Kim ...................... | H04L 1/1867 370/394 |
| 2015/0043435 | A1* | 2/2015 | Blankenship ...... | H04B 7/15507 370/329 |
| 2016/0088127 | A1* | 3/2016 | Cai .................... | H04W 28/0205 370/328 |
| 2016/0119826 | A1* | 4/2016 | Huh ...................... | H04W 36/04 370/332 |
| 2016/0164793 | A1* | 6/2016 | Basu Mallick ....... | H04L 47/564 370/235 |
| 2016/0352469 | A1 | 12/2016 | Xiao et al. | |
| 2016/0352643 | A1 | 12/2016 | Xiao et al. | |
| 2017/0142770 | A1 | 5/2017 | Fu et al. | |
| 2019/0327607 | A1* | 10/2019 | Xiao ..................... | H04L 5/0053 |

FOREIGN PATENT DOCUMENTS

| | | |
|---|---|---|
| CN | 101547141 A | 9/2009 |
| CN | 101729524 A | 6/2010 |
| CN | 103888222 A | 6/2014 |
| CN | 104837127 A | 8/2015 |
| CN | 104837163 A | 8/2015 |
| EP | 2887726 A1 | 6/2015 |
| JP | 2003283592 A | 10/2003 |
| WO | 2011020233 A1 | 2/2011 |

OTHER PUBLICATIONS

Written Opinion of the International Searching Authority issued in International Application No. PCT/CN2017/088975, dated Mar. 16, 2018 (10p).

ISA State Intellectual Property Office of the People's Republic of China, International Search Report Issued in Application No. PCT/CN2017/088975, dated Mar. 16, 2018, WIPO, 4 pages.

3rd Generation Partnership Project; Technical Specification Group Radio Access Network; Evolved Universal Terrestrial Radio Access (E-UTRA); Radio Link Control (RLC) protocol specification (Release 15), 3GPP TS 36.322 V15.3.0 (Sep. 2019), (45p).

3rd Generation Partnership Project; Technical Specification Group Radio Access Network; Evolved Universal Terrestrial Radio Access (E-UTRA); Packet Data Convergence Protocol (PDCP) specification (Release 15), 3GPP TS 36.323 V15.4.0 (Jun. 2019), (52p).

* cited by examiner

METHOD AND APPARATUS FOR PROCESSING DATA, USER EQUIPMENT AND COMPUTER-READABLE STORAGE MEDIUM

CROSS REFERENCE TO RELATED APPLICATION

The present application is the U.S. national phase of PCT Application No. PCT/CN2017/088975 filed on Jun. 19, 2017, which is incorporated herein by reference in its entirety.

TECHNICAL FIELD

The present disclosure relates to the field of communication technology, and in particular to a method and an apparatus for processing data, user equipment and a computer-readable storage medium.

BACKGROUND

At present, in a Long Term Evolution (LTE) protocol, when receiving an uplink Packet Data Convergence Protocol (PDCP) Service Data Unit (SDU) from an upper layer, a PDCP layer may add a discard timer for each SDU. If the discard timer of the PDCP SDU expires, or a PDCP state report confirms the PDCP SDU has been successfully sent, User Equipment (UE) will discard the PDCP SDU and a corresponding PDCP Packet Data Unit (PDU). If the PDCP PDU is already delivered to a Radio Link Control (RLC) layer, the PDCP layer may notify the RLC layer to discard the PDU. After receiving a notification from the PDCP layer, the RLC layer may delete the PDCP PDU if the PDCP PDU is not yet mapped to an RLC data PDU.

When a PDCP SDU mapped to an RLC Acknowledged Mode (AM) is delivered to the RLC layer, if a successful sending instruction is not received from the RLC layer, it is required to resend an unsuccessfully-sent PDCP SDU during a PDCP layer re-establishment procedure. Thus, the unsuccessfully-sent PDCP SDU must be retained in the PDCP layer. A PDCP SDU mapped to an RLC Unacknowledged Mode (UM) or a Transparent Mode (TM) is discarded only when the discard timer expires.

SUMMARY

In view of this, a method and an apparatus for processing data, user equipment, and a computer-readable storage medium are provided by examples of the present disclosure, so as to reduce cache space occupied by a PDCP SDU.

According to a first aspect of the examples of the present disclosure, a method of processing data is provided, the method includes:

receiving, by a PDCP layer, a PDCP SDU from an upper layer; and for a PDCP SDU mapped to a UM or a TM of an RLC layer, when a discard timer corresponding to the PDCP SDU does not expire and another preset condition is satisfied, deleting the PDCP SDU and a PDCP PDU corresponding to the PDCP SDU.

In an example, deleting the PDCP SDU and the PDCP PDU corresponding to the PDCP SDU when the discard timer corresponding to the PDCP SDU does not expire and the another preset condition is satisfied includes:

when the discard timer corresponding to the PDCP SDU does not expire and the PDCP PDU corresponding to the PDCP SDU is delivered to the RLC layer, deleting the PDCP SDU and the PDCP PDU corresponding to the PDCP SDU.

In an example, deleting the PDCP SDU and the PDCP PDU corresponding to the PDCP SDU when the discard timer corresponding to the PDCP SDU does not expire and the another preset condition is satisfied includes:

when the discard timer corresponding to the PDCP SDU does not expire and it is confirmed, based on first indication information fed back to the PDCP layer by the RLC layer, that the PDCP PDU corresponding to the PDCP SDU is associated with an RLC PDU, deleting the PDCP SDU and the PDCP PDU corresponding to the PDCP SDU.

In an example, deleting the PDCP SDU and the PDCP PDU corresponding to the PDCP SDU when the discard timer corresponding to the PDCP SDU does not expire and the another preset condition is satisfied includes:

when the discard timer corresponding to the PDCP SDU does not expire and it is confirmed, based on second indication information fed back to the PDCP layer by the RLC layer, that an RLC PDU associated with the PDCP PDU corresponding to the PDCP SDU is delivered to a lower layer, deleting the PDCP SDU and the PDCP PDU corresponding to the PDCP SDU.

In an example, confirming, based on the second indication information fed back to the PDCP layer by the RLC layer, that the RLC PDU associated with the PDCP PDU corresponding to the PDCP SDU is delivered to the lower layer includes:

confirming, based on the second indication information, that an RLC PDU associated with the first segment of the PDCP PDU is delivered to the lower layer; or confirming, based on the second indication information, that each RLC PDU associated with respective one of all segments of the PDCP PDU is delivered to the lower layer.

In an example, the method further includes:

upon deleting the PDCP SDU and the PDCP PDU corresponding to the PDCP SDU, deleting the discard timer corresponding to the PDCP SDU.

According to a second aspect of the examples of the present disclosure, an apparatus for processing data is provided, the apparatus includes:

a receiving module configured to receive a PDCP SDU from an upper layer; and a first deleting module configured to, for a PDCP SDU mapped to a UM or a TM of a RLC layer, delete the PDCP SDU and a PDCP PDU corresponding to the PDCP SDU when a discard timer corresponding to the PDCP SDU does not expire and another preset condition is satisfied.

In an example, the first deleting module includes:

a first deleting sub-module configured to delete the PDCP SDU and the PDCP PDU corresponding to the PDCP SDU when the discard timer corresponding to the PDCP SDU does not expire and the PDCP PDU corresponding to the PDCP SDU is delivered to the RLC layer.

In an example, the first deleting module includes:

a second deleting sub-module configured to delete the PDCP SDU and the PDCP PDU corresponding to the PDCP SDU when the discard timer corresponding to the PDCP SDU does not expire and it is confirmed, based on first indication information fed back to a PDCP layer by the RLC layer, that the PDCP PDU corresponding to the PDCP SDU is associated with an RLC PDU.

In an example, the first deleting module includes:

a third deleting sub-module configured to delete the PDCP SDU and the PDCP PDU corresponding to the PDCP SDU when the discard timer corresponding to the PDCP SDU does not expire and it is confirmed, based on second indication information fed back to a PDCP layer by the RLC layer, that an RLC PDU associated with the PDCP PDU corresponding to the PDCP SDU is delivered to a lower layer.

In an example, the third deleting sub-module includes:

a first confirming unit configured to confirm, based on the second indication information, that an RLC PDU associated with the first segment of the PDCP PDU is delivered to the lower layer; or a second confirming unit configured to confirm, based on the second indication information, that each RLC PDU associated with respective one of all segments of the PDCP PDU is delivered to the lower layer.

In an example, the apparatus further includes:

a second deleting module configured to delete the discard timer corresponding to the PDCP SDU when the first deleting module deletes the PDCP SDU and the PDCP PDU corresponding to the PDCP SDU.

According to a third aspect of the examples of the present disclosure, user equipment is provided, the user equipment includes:

a processor; and a memory storing instructions executable by the processor, where the processor is configured to:

receive, by a PDCP layer, a PDCP SDU from an upper layer; and for a PDCP SDU mapped to a UM or a TM of a RLC layer, when a discard timer corresponding to the PDCP SDU does not expire and another preset condition is satisfied, delete the PDCP SDU and a PDCP PDU corresponding to the PDCP SDU.

According to a fourth aspect of the examples of the present disclosure, a computer-readable storage medium the storing a computer program is provided. When the program is executed by a processor, causes the processor to implement the above methods of processing data.

The technical solutions according to the examples of the present disclosure may have the following beneficial effects.

For a PDCP SDU mapped to a UM or a TM of a RLC layer, the PDCP SDU and a PDCP PDU corresponding to the PDCP SDU are deleted if a discard timer corresponding to the PDCP SDU does not expire and another preset condition is satisfied. Thus, the PDCP SDU will not reside in a UE cache, thereby reducing cache space occupied by the PDCP SDU.

For the PDCP SDU mapped to the UM or the TM of the RLC layer, the PDCP SDU and the PDCP PDU corresponding to the PDCP SDU are deleted if the discard timer corresponding to the PDCP SDU does not expire and the PDCP PDU corresponding to the PDCP SDU is delivered to the RLC layer. Thus, the PDCP SDU will not reside in the UE cache, thereby reducing cache space occupied by the PDCP SDU.

For the PDCP SDU mapped to the UM or the TM of the RLC layer, the PDCP SDU and the PDCP PDU corresponding to the PDCP SDU are deleted if the discard timer corresponding to the PDCP SDU does not expire and it is confirmed, based on first indication information fed back to the PDCP layer by the RLC layer, that the PDCP PDU corresponding to the PDCP SDU is associated with an RLC PDU. Thus, the PDCP SDU will not reside in the UE cache, thereby reducing cache space occupied by the PDCP SDU.

For the PDCP SDU mapped to the UM or the TM of the RLC layer, the PDCP SDU and the PDCP PDU corresponding to the PDCP SDU are deleted if the discard timer corresponding to the PDCP SDU does not expire and it is confirmed, based on second indication information fed back to the PDCP layer by the RLC layer, that an RLC PDU associated with the PDCP PDU corresponding to the PDCP SDU is delivered to a lower layer. Thus, the PDCP SDU will not reside in the UE cache, thereby reducing cache space occupied by the PDCP SDU.

It may be confirmed that the RLC PDU associated with the PDCP PDU corresponding to the PDCP SDU is delivered to the lower layer in several manners. Therefore, the implementation is flexible.

Computing resources of the UE may be saved by deleting the discard timer corresponding to the PDCP SDU when the PDCP SDU and the PDCP PDU corresponding to the PDCP SDU are deleted.

It should be understood that the above general descriptions and subsequent detailed descriptions are merely illustrative and explanatory and shall not be intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
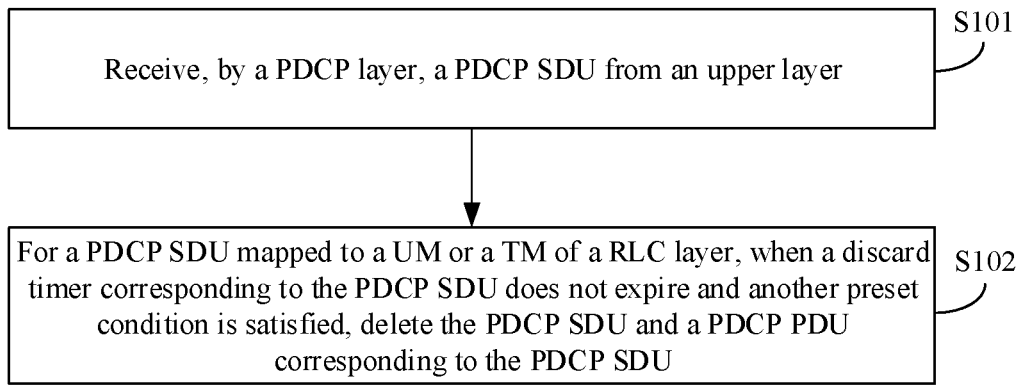
FIG. 1 is a flowchart illustrating a method of processing data according to an example of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of processing data according to an example of the present application. The method is described from a UE side. As shown in FIG. 1, the method of processing data includes the following steps.

At step S101, a PDCP layer receives a PDCP SDU from an upper layer next to the PDCP layer.

At step S102, for a PDCP SDU mapped to a UM or a TM of an RLC layer, when a discard timer corresponding to the PDCP SDU does not expire and another preset condition is satisfied, the PDCP SDU and a PDCP PDU corresponding to the PDCP SDU are deleted.

The another preset condition includes, but not limited to, at least one of the followings: 1) the PDCP PDU corresponding to the PDCP SDU is delivered to the RLC layer; 2) the PDCP layer confirms, based on first indication information fed back to a PDCP layer by the RLC layer, that the PDCP PDU corresponding to the PDCP SDU is associated with an RLC PDU; or 3) the PDCP layer confirms that the RLC PDU associated with the PDCP PDU corresponding to the PDCP SDU is delivered to a lower layer next to the RLC layer based on second indication information fed back to the PDCP layer by the RLC layer. Thus, if the discard timer corresponding to the PDCP SDU does not expire and the PDCP PDU corresponding to the PDCP SDU is delivered to the RLC layer, the PDCP SDU and the PDCP PDU corresponding thereto are deleted. If the discard timer corresponding to the PDCP SDU does not expire and it is confirmed, based on first indication information fed back to the PDCP layer by the RLC layer, that the PDCP PDU corresponding to the PDCP SDU is associated with an RLC PDU, the PDCP SDU and the PDCP PDU corresponding thereto are deleted. If the discard timer corresponding to the PDCP SDU does not expire and it is confirmed, based on second indication information fed back to the PDCP layer by the RLC layer, that an RLC PDU associated with the PDCP PDU corresponding to the PDCP SDU is delivered to a lower layer, the PDCP SDU and the PDCP PDU corresponding thereto are deleted.

In the example, for the PDCP SDU mapped to the UM or the TM of the RLC layer, when the discard timer corresponding to the PDCP SDU does not expire and the another preset condition is satisfied, the PDCP SDU and the PDCP PDU corresponding to the PDCP SDU are deleted. Thus, the PDCP SDU will not reside in a cache of the UE, thereby reducing cache space occupied by the PDCP SDU.

Figure 2:
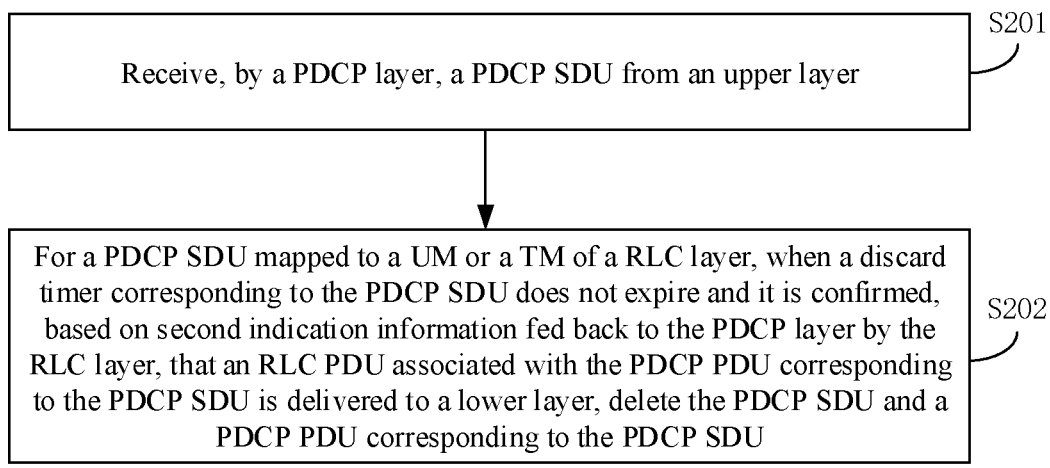
FIG. 2 is a flowchart illustrating another method of processing data according to an example of the present application.

FIG. 2 is a flowchart illustrating another method of processing data according to an example of the present application. The method is described from a UE side. As shown in FIG. 2, the method of processing data includes the following steps.

At step S201, a PDCP layer receives a PDCP SDU from an upper layer next to the PDCP layer.

At step S202, for a PDCP SDU mapped to a UM or a TM of an RLC layer, when a discard timer corresponding to the PDCP SDU does not expire and an RLC PDU associated with a PDCP PDU corresponding to the PDCP SDU is confirmed to be delivered to a lower layer based on second indication information fed back to the PDCP layer by the RLC layer, the PDCP SDU and the PDCP PDU corresponding to the PDCP SDU are deleted.

The lower layer is a Media Access Control (MAC) layer.

In the example, the RLC PDU associated with the PDCP PDU corresponding to the PDCP SDU may be confirmed to be delivered to the lower layer with the following manners.

In a first manner, an RLC PDU associated with the first segment of the PDCP PDU is confirmed to be delivered to the lower layer based on the second indication information.

In a second manner, each RLC PDU associated with respective one of all segments of the PDCP PDU is confirmed to be delivered to the lower layer based on the second indication information.

Therefore, in the example, the RLC PDU associated with the PDCP PDU corresponding to the PDCP SDU can be confirmed to be delivered to the lower layer with several manners, which are flexible for implementing.

In the example, for the PDCP SDU mapped to the UM or the TM of the RLC layer, when the RLC PDU associated with the PDCP PDU corresponding to the PDCP SDU is confirmed to be delivered to the lower layer, the PDCP SDU and the PDCP PDU corresponding to the PDCP SDU are deleted. Thus, the PDCP SDU will not reside in a cache of the UE, thereby reducing cache space occupied by the PDCP SDU.

Figure 3:
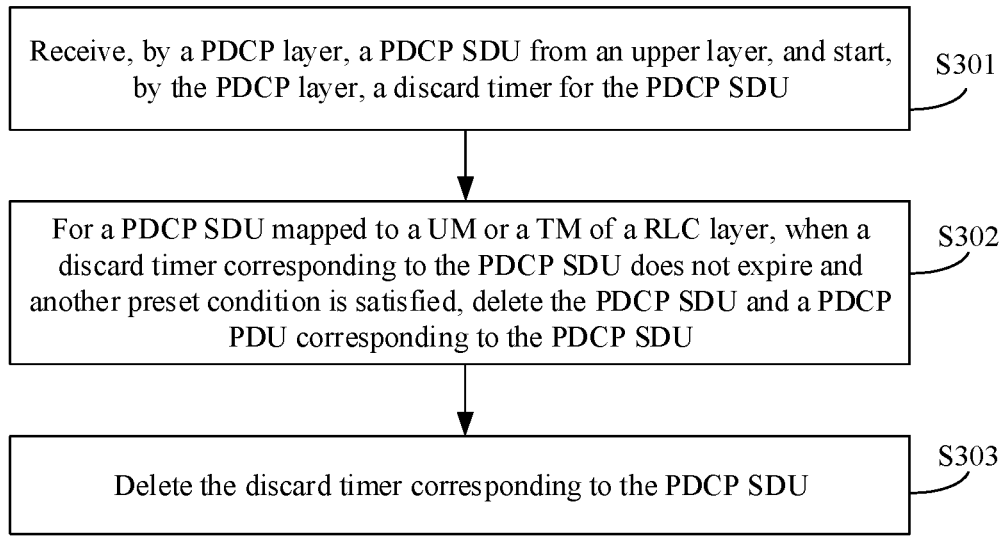
FIG. 3 is a flowchart illustrating another method of processing data according to an example of the present application.

FIG. 3 is a flowchart illustrating another method of processing data according to an example of the present application. The method is described from a UE side. As shown in FIG. 3, the method of processing data includes the following steps.

At step S301, a PDCP layer receives a PDCP SDU from an upper layer, and starts a discard timer for the PDCP SDU.

In the example, since a Radio Resources Control (RRC) layer configures a discard timer for a bearer where the PDCP SDU is located, the PDCP layer of the UE can start the discard timer for the PDCP SDU when receiving the PDCP SDU from the upper layer next to the PDCP layer.

At step S302, for a PDCP SDU mapped to a UM or a TM of an RLC layer, when a discard timer corresponding to the PDCP SDU does not expire and another preset condition is satisfied, the PDCP SDU and a PDCP PDU corresponding to the PDCP SDU are deleted.

At step S303, the discard timer corresponding to the PDCP SDU is deleted.

In the example, when the PDCP layer deletes the PDCP SDU and the PDCP PDU corresponding thereto, the PDCP layer deletes the discard timer corresponding to the PDCP SDU.

In the example, computing resources of the UE can be saved by deleting the discard timer corresponding to the PDCP SDU upon deleting the PDCP SDU and the PDCP PDU corresponding thereto.

Figure 4:
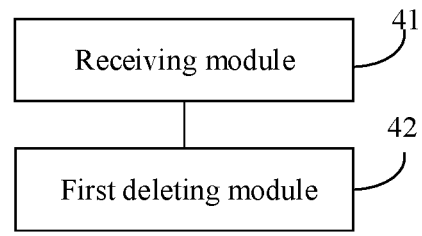
FIG. 4 is a block diagram illustrating an apparatus for processing data according to an example.

FIG. 4 is a block diagram illustrating an apparatus for processing data according to an example. The apparatus for processing data is located in UE. As shown in FIG. 4, the apparatus for processing data includes a receiving module 41 and a first deleting module 42.

The receiving module 41 is configured to receive a PDCP SDU from an upper layer.

The receiving module 41 may be located at a PDCP layer.

The first deleting module 42 is configured to, for a PDCP SDU mapped to a UM or a TM of a RLC layer, delete the PDCP SDU and a PDCP PDU corresponding to the PDCP SDU when a discard timer corresponding to the PDCP SDU does not expire and another preset condition is satisfied.

The preset condition includes, but not limited to, at least one of the followings: 1) the PDCP PDU corresponding to the PDCP SDU is delivered to the RLC layer; 2) it is confirmed, based on first indication information fed back to a PDCP layer by the RLC layer, that the PDCP PDU corresponding to the PDCP SDU is associated with an RLC PDU; or 3) it is confirmed, based on second indication information fed back to a PDCP layer by the RLC layer, that an RLC PDU associated with the PDCP PDU corresponding to the PDCP SDU is delivered to a lower layer. That is, if the discard timer corresponding to the PDCP SDU does not expire and the PDCP PDU corresponding to the PDCP SDU is delivered to the RLC layer, the PDCP SDU and the PDCP PDU corresponding thereto are deleted. If the discard timer corresponding to the PDCP SDU does not expire and it is confirmed, based on first indication information fed back to the PDCP layer by the RLC layer, that the PDCP PDU corresponding to the PDCP SDU is associated with an RLC PDU, the PDCP SDU and the PDCP PDU corresponding thereto are deleted. If the discard timer corresponding to the PDCP SDU does not expire and it is confirmed, based on second indication information fed back to the PDCP layer by the RLC layer, that an RLC PDU associated with the PDCP PDU corresponding to the PDCP SDU is delivered to a lower layer, the PDCP SDU and the PDCP PDU corresponding thereto are deleted.

In the example, for the PDCP SDU mapped to the UM or the TM of the RLC layer, the PDCP SDU and the PDCP PDU corresponding to the PDCP SDU are deleted when the discard timer corresponding to the PDCP SDU does not expire and another preset condition is satisfied. Thus, the PDCP SDU will not reside in a cache of the UE, thereby reducing cache space occupied by the PDCP SDU.

Figure 5:
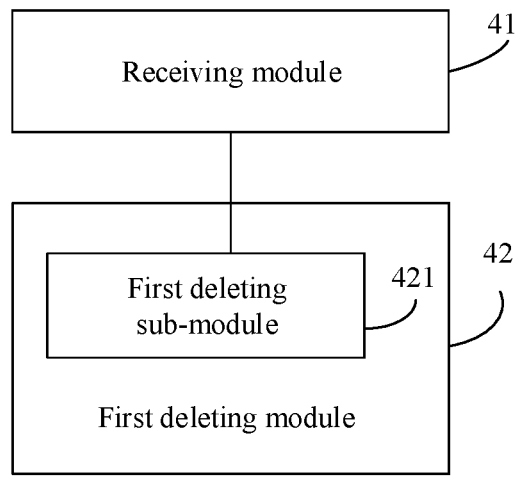
FIG. 5 is a block diagram illustrating another apparatus for processing data according to an example.

FIG. 5 is a block diagram illustrating another apparatus for processing data according to an example. As shown in FIG. 5, based on the above example of FIG. 4, the first deleting module 42 may include a first deleting sub-module 421.

The first deleting sub-module 421 is configured to delete the PDCP SDU and the PDCP PDU corresponding to the PDCP SDU when the discard timer corresponding to the PDCP SDU does not expire and the PDCP PDU corresponding to the PDCP SDU is delivered to the RLC layer.

In the example, for the PDCP SDU mapped to the UM or the TM of the RLC layer, the PDCP SDU and the PDCP PDU corresponding to the PDCP SDU are deleted when the PDCP PDU corresponding to the PDCP SDU is delivered to the RLC layer. Thus, the PDCP SDU will not reside in the cache of the UE, thereby reducing the cache space occupied by the PDCP SDU.

Figure 6:
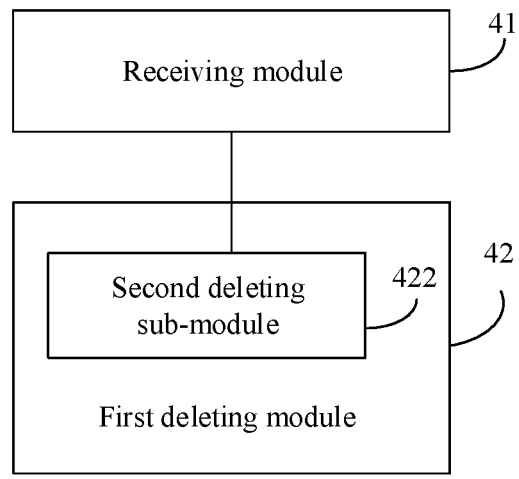
FIG. 6 is a block diagram illustrating another apparatus for processing data according to an example.

FIG. 6 is a block diagram illustrating another apparatus for processing data according to an example. As shown in FIG. 6, based on the above example of FIG. 4, the first deleting module 42 may include a second deleting sub-module 422.

The second deleting sub-module 422 is configured to delete the PDCP SDU and the PDCP PDU corresponding to the PDCP SDU when the discard timer corresponding to the PDCP SDU does not expire and it is confirmed, based on first indication information fed back to a PDCP layer by the RLC layer, that the PDCP PDU corresponding to the PDCP SDU is associated with an RLC PDU.

In the example, for the PDCP SDU mapped to the UM or the TM of the RLC layer, the PDCP SDU and the PDCP PDU corresponding to the PDCP SDU are deleted when it is confirmed, based on the first indication information fed back to the PDCP layer by the RLC layer, that the PDCP PDU corresponding to the PDCP SDU is associated with the RLC PDU. Thus, the PDCP SDU will not reside in the cache of the UE, thereby reducing the cache space occupied by the PDCP SDU.

Figure 7:
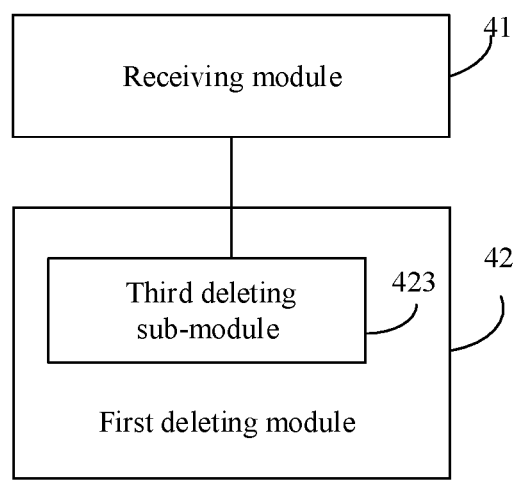
FIG. 7 is a block diagram illustrating another apparatus for processing data according to an example.

FIG. 7 is a block diagram illustrating another apparatus for processing data according to an example. As shown in FIG. 7, based on the above example of FIG. 4, the first deleting module 42 may include a third deleting sub-module 423.

The third deleting sub-module 423 is configured to delete the PDCP SDU and the PDCP PDU corresponding to the PDCP SDU when the discard timer corresponding to the PDCP SDU does not expire and it is confirmed, based on second indication information fed back to a PDCP layer by the RLC layer, that an RLC PDU associated with the PDCP PDU corresponding to the PDCP SDU is delivered to a lower layer.

In the example, for the PDCP SDU mapped to the UM or the TM of the RLC layer, the PDCP SDU and the PDCP PDU corresponding to the PDCP SDU are deleted when it is confirmed, based on the second indication information fed back to the PDCP layer by the RLC layer, that the RLC PDU associated with the PDCP PDU corresponding to the PDCP SDU is delivered to the lower layer. Thus, the PDCP SDU will not reside in the cache of the UE, thereby reducing the cache space occupied by the PDCP SDU.

Figure 8:
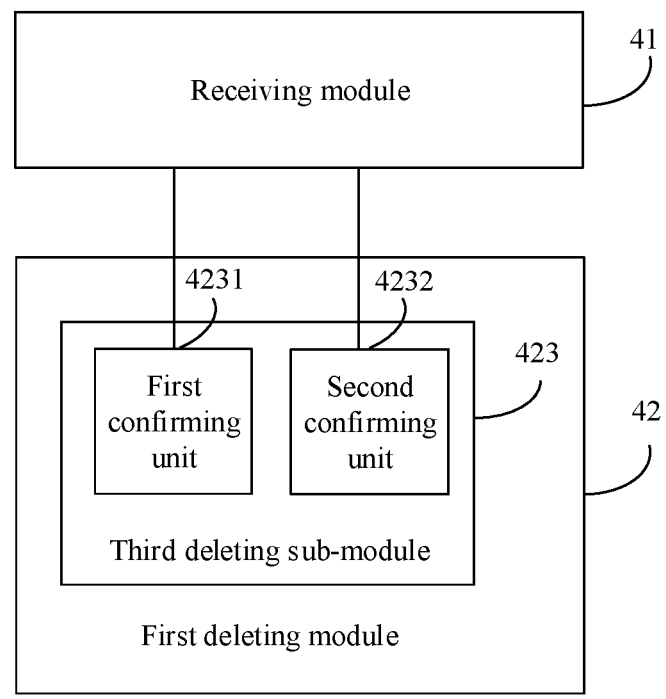
FIG. 8 is a block diagram illustrating another apparatus for processing data according to an example.

FIG. 8 is a block diagram illustrating another apparatus for processing data according to an example. As shown in FIG. 8, based on the above example of FIG. 7, the third deleting sub-module 423 may include a first confirming unit 4231 or a second confirming unit 4232.

The first confirming unit 4231 is configured to confirm, based on the second indication information, that an RLC PDU associated with the first segment of the PDCP PDU is delivered to the lower layer.

The second confirming unit 4232 is confirm, based on the second indication information, that each RLC PDU associated with respective one of all segments of the PDCP PDU is delivered to the lower layer.

In the example, it is confirmed that the RLC PDU associated with the PDCP PDU corresponding to the PDCP SDU is delivered to the lower layer in several manners. Therefore, the implementation is flexible.

Figure 9:
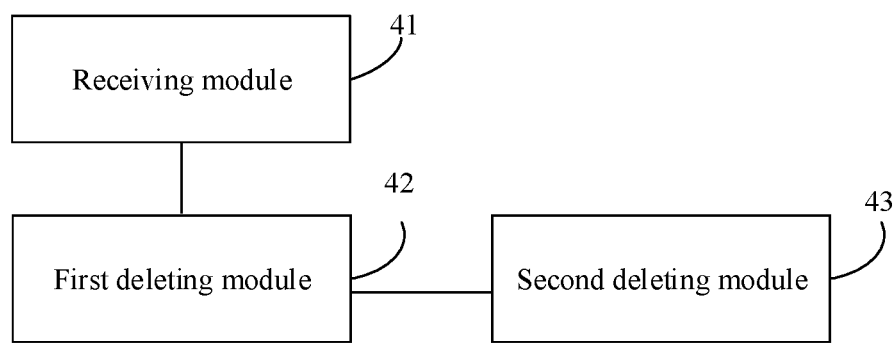
FIG. 9 is a block diagram illustrating another apparatus for processing data according to an example.

FIG. 9 is a block diagram illustrating another apparatus for processing data according to an example. As shown in FIG. 9, based on the above example of FIG. 4, the apparatus further includes:

A second deleting module 43, configured to delete the discard timer corresponding to the PDCP SDU when the first deleting module 42 deletes the PDCP SDU and the PDCP PDU corresponding to the PDCP SDU.

In the example, when the PDCP layer deletes a PDCP SDU and a PDCP PDU corresponding thereto, the discard timer corresponding to the PDCP SDU is deleted.

In the example, computing resources of the UE may be saved by deleting the discard timer corresponding to the PDCP SDU when the PDCP SDU and the PDCP PDU corresponding thereto are deleted.

Figure 10:
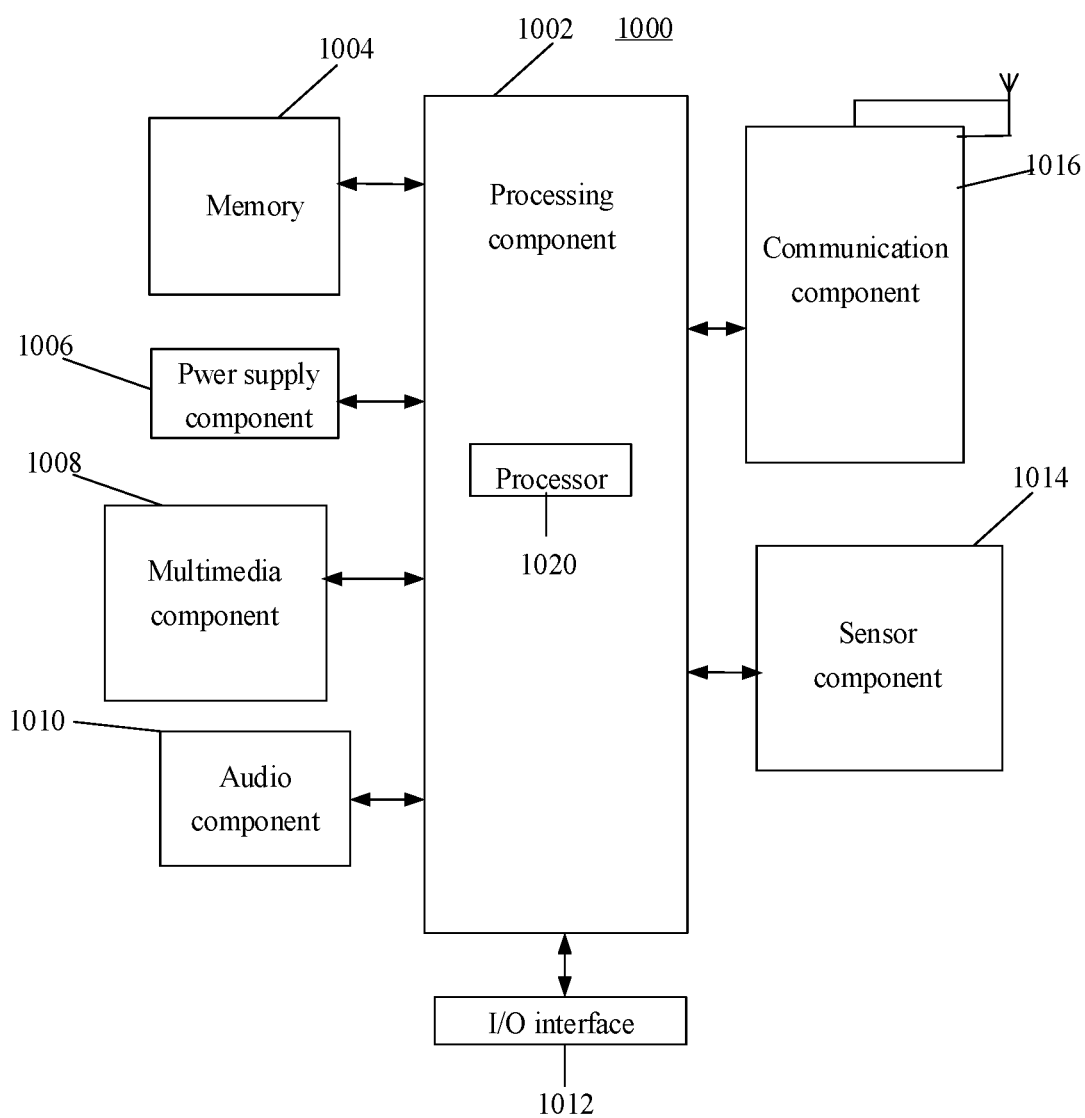
FIG. 10 is a block diagram illustrating an apparatus suitable for processing data according to an example.

FIG. 10 is a block diagram illustrating an apparatus suitable for processing data according to an example. For example, an apparatus 1000 may be user equipment, such as, a mobile phone, a computer, a digital broadcast terminal, a message receiving and transmitting device, a game console, a tablet device, a medical device, a fitness device, a personal digital assistant, and so on.

Referring to FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014 and a communication component 1016.

The processing component 1002 generally controls overall operations of the apparatus 1000, such as operations associated with display, phone calls, data communications, camera operations, and recording operations. The processing component 1002 may include one or more processors 1020 to execute instructions to complete all or part of the steps of the above methods. In addition, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is to store various types of data to support the operation of the apparatus 1000. Examples of such data include instructions for any application or method operated on the apparatus 1000, contact data, phonebook data, messages, pictures, videos, and so on. The memory 1004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or a compact disk.

The power supply component 1006 provides power to different components of the apparatus 1000. The power supply component 1006 may include a power management system, one or more power supplies, and other components associated with generating, managing, and distributing power for the apparatus 1000.

The multimedia component 1008 includes a screen providing an output interface between the apparatus 1000 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1008 may include a front camera and/or a rear camera. The front camera and/or rear camera may receive external multimedia data when the apparatus 1000 is in an operating mode, such as a photographing mode or a video mode. Each of the front camera and the rear camera may be a fixed optical lens system or have focal length and optical zooming capability.

The audio component 1010 is to output and/or input an audio signal. For example, the audio component 1010 includes a microphone (MIC). When the apparatus 1000 is in an operating mode, such as a call mode, a recording mode, and a voice recognition mode, the MIC is to receive an external audio signal. The received audio signal may be further stored in the memory 1004 or sent via the communication component 1016. In some examples, the audio component 1010 further includes a speaker to output an audio signal.

The I/O interface 1012 may provide an interface between the processing component 1002 and a peripheral interface module. The peripheral interface module may be a keyboard, a click wheel, buttons and so on. These buttons may include, but are not limited to, a home button, a volume button, a starting button and a locking button.

The sensor component 1014 includes one or more sensors to provide status assessments of various aspects for the apparatus 1000. For example, the sensor component 1014 may detect the on/off status of the apparatus 1000, and relative positioning of component, for example, the component is a display and a keypad of the apparatus 1000. The sensor component 1014 may also detect a change in position of the apparatus 1000 or a component of the apparatus 1000, a presence or absence of the contact between a user and the apparatus 1000, an orientation or an acceleration/deceleration of the apparatus 1000, and a change in temperature of the apparatus 1000. The sensor component 1014 may include a proximity sensor to detect the presence of a nearby object without any physical contact. The sensor component 1014 may further include an optical sensor, such as a Complementary Metal-Oxide-Semiconductor (CMOS) or Charged Coupled Device (CCD) image sensor which is used in imaging applications. In some examples, the sensor component 1014 may further include an acceleration sensor, a gyroscope sensor, a magnetic sensor, a pressure sensor, or a temperature sensor.

The communication component 1016 is to facilitate wired or wireless communication between the apparatus 1000 and another device. The apparatus 1000 may access a wireless network that is based on a communication standard, such as Wi-Fi, 2G or 3G, or a combination thereof. In an example, the communication component 1016 receives a broadcast signal or broadcast-associated information from an external broadcast management system via a broadcast channel. In an example, the communication component 1016 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1000 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-volatile computer-readable storage medium including instructions, such as a memory 1004 including instructions executable by the processor 1020 of the apparatus 1000 to perform the above methods. For example, the non-volatile computer readable storage medium is a ROM, a Random-Access Memory (RAM), a CD-ROM, a magnetic tape, a floppy disk, or an optical data storage device.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such process, method, article or device. Without more limitations, an element defined by the statement "including a . . . " shall not be precluded to include additional identical elements present in the process, method, article or device including the elements.

Other implementations of the present disclosure will be apparent to those skilled in the art from consideration of the specification and practice of the present disclosure herein.

The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of processing data, comprising:
receiving, by a Packet Data Convergence Protocol (PDCP) layer, a PDCP Service Data Unit (SDU) from an upper layer; and
deleting the PDCP SDU and a PDCP Packet Data Unit (PDU) corresponding to the PDCP SDU upon determining that a discard timer corresponding to the PDCP SDU is not expired and a preset condition is satisfied;
wherein the PDCP SDU is mapped to a Transparent Mode (TM) of a Radio Link Control (RLC) layer; and
wherein the preset condition comprises at least one of followings:
the PDCP PDU corresponding to the PDCP SDU is delivered to the RLC layer; or
the PDCP layer confirms, based on first indication information fed back to the PDCP layer by the RLC layer, that the PDCP PDU corresponding to the PDCP SDU is associated with an RLC PDU;
wherein the preset condition further comprises:
the PDCP layer confirms that the RLC PDU associated with the PDCP PDU corresponding to the PDCP SDU is delivered to a lower layer next to the RLC layer based on second indication information fed back to the PDCP layer by the RLC layer.

2. The method according to claim 1, further comprising:
upon deleting the PDCP SDU and the PDCP PDU corresponding to the PDCP SDU, deleting the discard timer corresponding to the PDCP SDU.

3. The method according to claim 1, wherein confirming, based on the second indication information fed back to the PDCP layer by the RLC layer, that the RLC PDU associated with the PDCP PDU corresponding to the PDCP SDU is delivered to the lower layer comprises:
confirming, based on the second indication information, that an RLC PDU associated with a first segment of the PDCP PDU is delivered to the lower layer.

4. The method according to claim 1, wherein confirming, based on the second indication information fed back to the PDCP layer by the RLC layer, that the RLC PDU associated with the PDCP PDU corresponding to the PDCP SDU is delivered to the lower layer comprises:
confirming, based on the second indication information, that each RLC PDU associated with respective one of all segments of the PDCP PDU is delivered to the lower layer.

5. A user equipment, comprising:
at least one processor; and
a memory storing instructions executable by the at least one processor,
wherein the at least one processor is configured to:
receive, by a Packet Data Convergence Protocol (PDCP) layer, a PDCP Service Data Unit (SDU) from an upper layer; and
delete the PDCP SDU and a PDCP Packet Data Unit (PDU) corresponding to the PDCP SDU upon determining that a discard timer corresponding to the PDCP SDU is not expired and a preset condition is satisfied;
wherein the PDCP SDU is mapped to a Transparent Mode (TM) of a Radio Link Control (RLC) layer; and
wherein the preset condition comprises at least one of followings:
the PDCP PDU corresponding to the PDCP SDU is delivered to the RLC layer; or
the PDCP layer confirms, based on first indication information fed back to the PDCP layer by the RLC layer, that the PDCP PDU corresponding to the PDCP SDU is associated with an RLC PDU;
wherein the preset condition further comprises:
the PDCP layer confirms that the RLC PDU associated with the PDCP PDU corresponding to the PDCP SDU is delivered to a lower layer next to the RLC layer based on second indication information fed back to the PDCP layer by the RLC layer.

6. The user equipment according to claim 5, wherein the at least one processor is further configured to:
upon deleting the PDCP SDU and the PDCP PDU corresponding to the PDCP SDU, delete the discard timer corresponding to the PDCP SDU.

7. The user equipment according to claim 5, wherein the at least one processor is further configured to:
confirm, based on the second indication information, that an RLC PDU associated with a first segment of the PDCP PDU is delivered to the lower layer.

8. The user equipment according to claim 5, wherein the at least one processor is further configured to:
confirm, based on the second indication information, that each RLC PDU associated with respective one of all segments of the PDCP PDU is delivered to the lower layer.

9. A non-transitory computer-readable storage medium storing a computer program that, upon execution by a processor, causes the processor to:
receive, by a Packet Data Convergence Protocol (PDCP) layer, a PDCP Service Data Unit (SDU) from an upper layer; and
delete the PDCP SDU and a PDCP Packet Data Unit (PDU) corresponding to the PDCP SDU upon determining that a discard timer corresponding to the PDCP SDU is not expired and a preset condition is satisfied;
wherein the PDCP SDU is mapped to a Transparent Mode (TM) of a Radio Link Control (RLC) layer; and
wherein the preset condition comprises at least one of followings:
the PDCP PDU corresponding to the PDCP SDU is delivered to the RLC layer; or
the PDCP layer confirms, based on first indication information fed back to the PDCP layer by the RLC layer, that the PDCP PDU corresponding to the PDCP SDU is associated with an RLC PDU;
wherein the preset condition further comprises:
the PDCP layer confirms that the RLC PDU associated with the PDCP PDU corresponding to the PDCP SDU is delivered to a lower layer next to the RLC layer based on second indication information fed back to the PDCP layer by the RLC layer.

10. The non-transitory computer-readable storage medium according to claim 9, wherein the computer program further causes the processor to:
　　upon deleting the PDCP SDU and the PDCP PDU corresponding to the PDCP SDU, delete the discard timer corresponding to the PDCP SDU.

11. The non-transitory computer-readable storage medium according to claim 9, wherein the computer program further causes the processor to:
　　confirm, based on the second indication information, that an RLC PDU associated with a first segment of the PDCP PDU is delivered to the lower layer.

12. The non-transitory computer-readable storage medium according to claim 9, wherein the computer program further causes the processor to:
　　confirm, based on the second indication information, that each RLC PDU associated with respective one of all segments of the PDCP PDU is delivered to the lower layer.

* * * * *